UNITED STATES PATENT OFFICE.

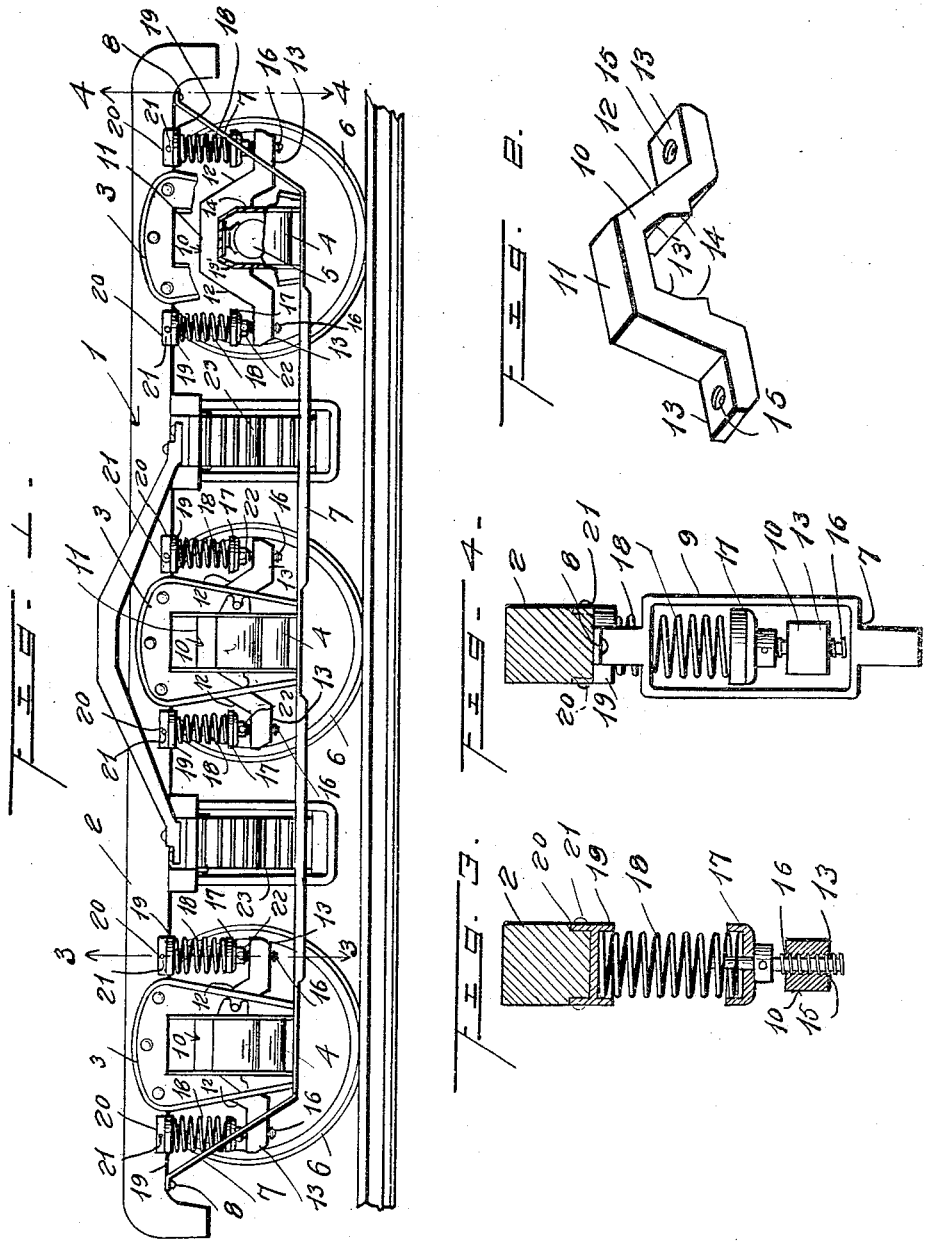

PERLEY D. JACKSON, OF LOS ANGELES, CALIFORNIA.

RAILWAY-TRUCK.

1,294,272.   Specification of Letters Patent.   Patented Feb. 11, 1919.

Application filed June 25, 1918.   Serial No. 241,802.

*To all whom it may concern:*

Be it known that I, PERLEY D. JACKSON, a citizen of the United States, residing at Los Angeles, in the county of Los Angeles and State of California, have invented certain new and useful Improvements in Railway-Trucks; and I do hereby declare the following to be a full, clear, and exact description of the invention, such as will enable others skilled in the art to which it appertains to make and use the same.

This invention relates to improvements in car trucks and the primary object of the invention is to provide a six wheel car truck in which the forged equalizing bars are dispensed with and a cast steel yoke arranged to fit on the journal boxes substituted therefor, so as to eliminate the cost of the forged equalizing bars and the inconveniences usually associated with the use thereof.

Another object of the invention is to provide a six wheel truck in which a cast steel yoke is provided for each of the journal boxes, the yokes supporting a pair of coil springs, which are supported in adjustable sockets, so that the tension of the springs can be adjusted and thereby balance the weight evenly on the journal box, thereby allowing it to slide freely in the pedestal and reducing the friction to a minimum.

A further object of the invention is to provide an improved six wheel car truck of the above character, which is durable and efficient in use, one that is simple and easy to manufacture, and one that can be placed upon the market at a reasonable cost.

With these and other objects in view, the invention consists in the novel construction, arrangement and formation of parts, as will be hereinafter more specifically described, claimed, and illustrated in the accompanying drawing, forming a part thereof, in which—

Figure 1 is a side elevation of the improved car truck,

Fig. 2 is a detail perspective view of one of the yokes,

Fig. 3 is a transverse section taken on the line 3—3 of Fig. 1, and

Fig. 4 is a detail section taken on the line 4—4 of Fig. 1.

Referring to the drawings in detail wherein similar reference numerals designate corresponding parts, throughout the several views, the numeral 1 generally indicates a car truck constructed in accordance with my invention, which includes the ordinary car truck frame having the side or wheel pieces 2 carrying the pedestals 3, which receive the journal boxes 4 in which are mounted the axles 5 carrying the wheels 6. The tie bars 7 extend longitudinally of the car truck and under the journal boxes and pedestals and have their ends secured as at 7' to the wheel pieces 2. The ends of the tie or stay bars 7 are slotted, and the portions lying on each side of the slots are bent outwardly in spaced parallel relation as at 9 for a purpose which will hereinafter more fully appear. As can be readily seen from the drawings, the ordinary equalizing bars are entirely dispensed with and cast steel yokes 10 are substituted therefor which are adapted to seat over the journal boxes 4. The improved yokes 10 includes the bight portion 11, downwardly and outwardly inclined legs 12, having the outwardly directed angular terminals 13, which extend parallel with the wheel pieces 2. The inner faces of the yokes 10 are formed to conform to the configuration of the upper surface of the journal box and have the inclined faces 13 for engaging the beveled sides of the journal box and the downwardly directed vertical faces 14 for engaging the sides of the box to prevent lateral movement of the yokes. These yokes fit flat on the upper surface of the journal box and if necessary, the upper faces of the journal boxes will have to be filed flat to receive the bight portions of the yokes.

The outwardly extending angular terminals 13 of the yokes are provided with vertical threaded bores 15 for receiving screws 16 which carry at their upper ends the sockets 17 in which are seated expansion coil springs 18, which have their upper ends fitted in sockets 19 which have upwardly extending spaced ears 20 that are adapted to embrace the sides of the wheel pieces 2 and are held in place by suitable fastening elements 21. The screws 16 are provided with a boss 22 through which are drilled holes at right angles to each other adapted to receive the point of a pinch bar, or other suitable tool by which they may be turned, so as to raise or lower the sockets, and thus adjust the tension of the coil springs 18, which allows the weight to be evenly balanced on the journal box, thus allowing the same to slide freely in the pedestal and reducing the friction to a minimum. Above the boss these screws are provided with a shank or stud 16' adapted to turn freely in holes drilled in the center of the coil seats or sockets 17.

The outer terminals of the end yokes extend beyond the stay bars 7, which are slotted as described above to receive the same. The ordinary leaf springs 23 are carried by the truck.

From the foregoing description, it can be seen that an improved six wheel car truck is provided, in which the journal boxes support yokes, which in turn support springs, the tension of which can be readily adjusted so as to balance the weight on the journal boxes and thus reduce the friction thereof to a minimum.

In practice, I have found that the form of my invention, illustrated in the accompanying drawings and referred to in the above description, as the preferred embodiment, is the most efficient and practical; yet, realizing the conditions concurrent with the adoption of my device will necessarily vary, I desire to emphasize the fact that various minor changes in details of construction, proportion and arrangement of parts may be resorted to, when required without sacrificing any of the advantages of my invention as set forth.

What I claim as new is:—

1. A car truck comprising a frame, pedestals carried by the frame, journal boxes mounted in the pedestals, an inverted U-shaped yoke carried by each journal box, coil springs connecting each end of the yoke with the frame, and means for adjusting the tension of the springs, as and for the purpose specified.

2. A car truck comprising a frame, pedestals carried by the frame, journal boxes mounted in the pedestals, an inverted U-shaped yoke carried by each journal box, said yokes having outwardly extending angular terminals, said terminals each having a screw threaded bore, a screw turned in said bore, a socket mounted on said screw and turning freely thereon, and a coil spring supported in each one of said sockets and having its opposite terminal secured to the car frame, and means for rotating said screw, as and for the purpose specified.

In testimony whereof I affix my signature in presence of two witnesses.

PERLEY D. JACKSON.

Witnesses:
FRED. J. HARRIS,
E. C. VANDENBURGH.

Copies of this patent may be obtained for five cents each, by addressing the "Commissioner of Patents, Washington, D. C."